(Model.)
J. J. SIEBERT.
HAY RACK.
No. 268,048. Patented Nov. 28, 1882.
2 Sheets—Sheet 1.
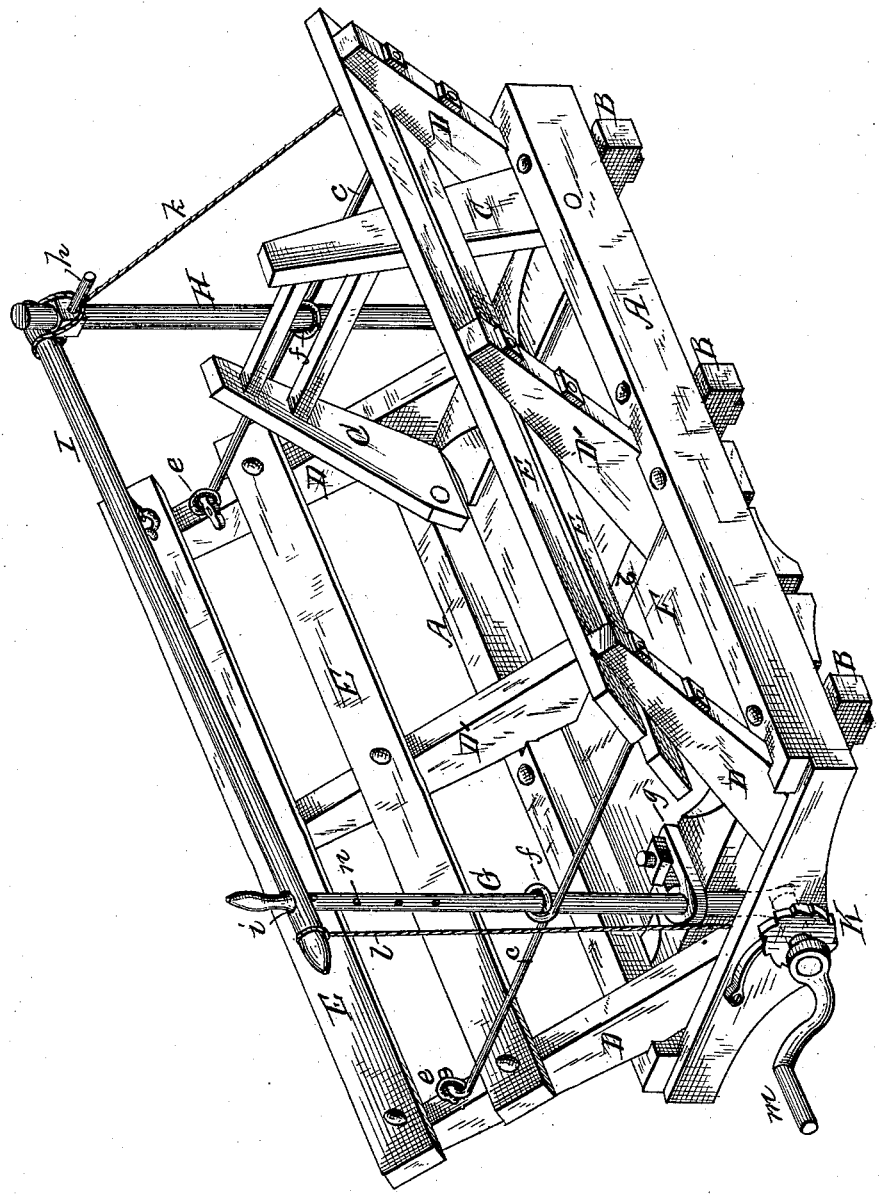
WITNESSES
F. L. Ourand
N. E. Oliphant
INVENTOR
John J. Siebert
per Chas. H. Fowler.
Attorney (Model.) 2 Sheets—Sheet 2.
J. J. SIEBERT.
HAY RACK.
No. 268,048. Patented Nov. 28, 1882.
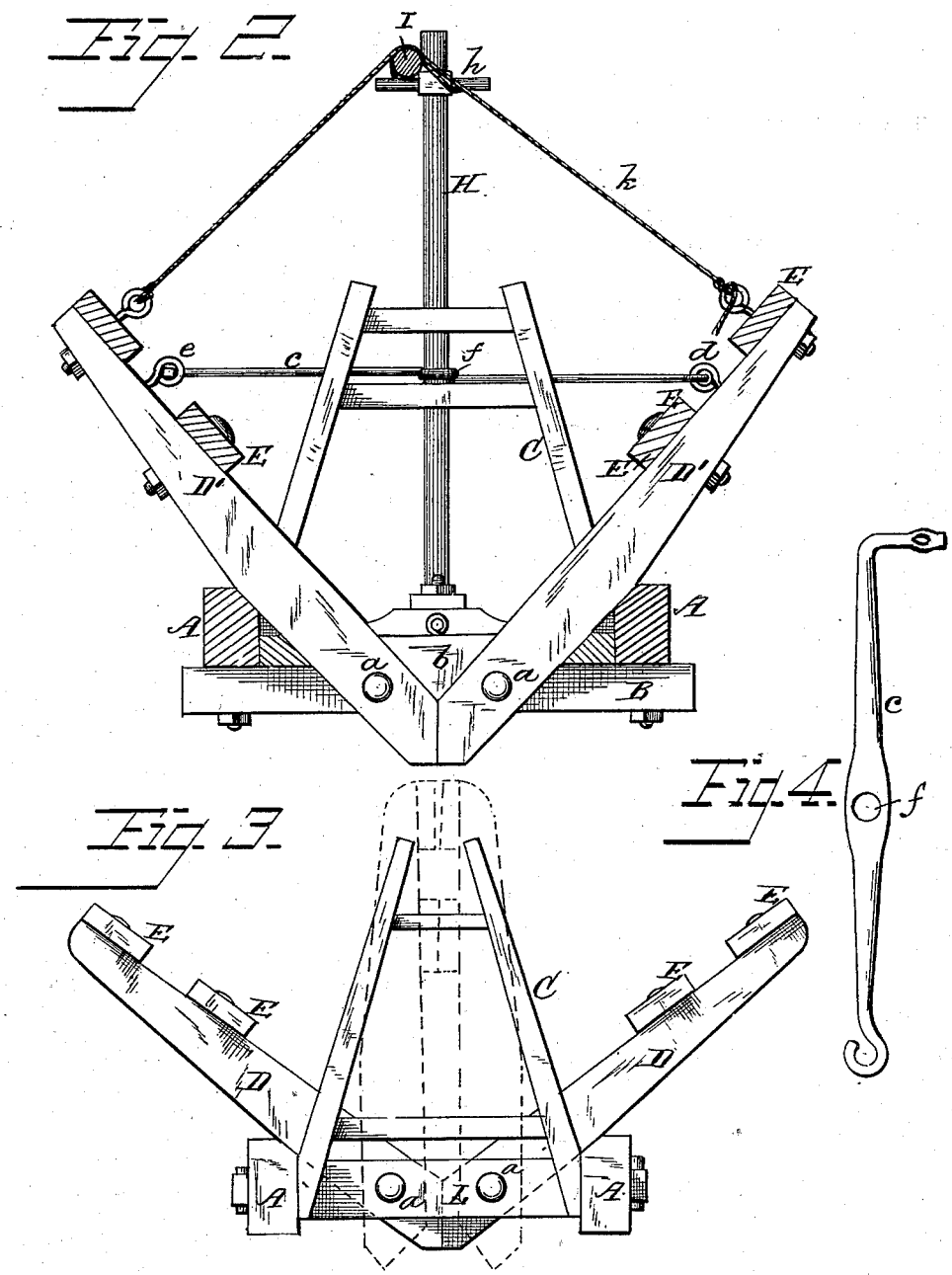
WITNESSES
F. L. Ourand
N. E. Oliphant
INVENTOR
John J. Siebert,
per Chas. H. Fowler
Attorney

UNITED STATES PATENT OFFICE.

JOHN J. SIEBERT, OF McGIRK, MISSOURI.

HAY-RACK.

SPECIFICATION forming part of Letters Patent No. 268,048, dated November 28, 1882.

Application filed September 9, 1882. (Model.)

*To all whom it may concern:*

Be it known that I, JOHN J. SIEBERT, a citizen of the United States, residing at McGirk, in the county of Mouiteau and State of Missouri, have invented certain new and useful Improvements in Hay-Frames; and I do hereby declare that the following is a full, clear, and exact description of the same, reference being had to the annexed drawings, making a part of this specification, and to the letters and figures of reference marked thereon.

Figure 1 of the drawings is a perspective view of my invention; Fig. 2, a cross-section; Fig. 3, a modification of the same, and Fig. 4 a detail view of a modification of the brace-rods.

This invention relates to frames for the purpose of conveying hay, straw, and like produce from one place to another; and the object thereof is to provide such a device whereby the hay or other like substance may be securely loaded and held within the frame during transportation, and when not in use the said frame may be folded up and laid away, thereby requiring less room for storage than frames of the ordinary construction, the invention consisting in the construction and arrangement of the several parts, as illustrated in the accompanying drawings and hereinafter described.

In the drawings, A represents the ordinary side pieces of a hay-frame, secured to bolsters B, and provided with the usual upright, C. To the bolsters B are pivoted, by means of bolts $a$, standards D, to which are secured slats E at convenient distances apart, said standards and slats forming the sides of the frame. The standards at the front and rear of the frame are secured to the bolsters beyond the floor F, while those intermediate, passing through the said floor or bed, are braced, and the sides thus prevented from closing up, by means of a triangular piece, $b$, set in between the opposing intermediate standards and coming flush with the floor or bed. As additional braces to the sides, rods $c$ are employed, which are permanently secured to eyes $d$ upon one side and hook into eyes $e$ upon the other, the said rods being twisted or bent in such a way as to form loops $f$ in their centers, through which are passed upright posts G H, for the purpose of supporting the binder-pole I. These brace-rods $c$ may be cast or forged of a form similar to that illustrated by Fig. 4, for the purpose of giving additional strength and preventing the loops or holes $f$ from being drawn out by the pressure of the load when the upright posts are removed therefrom. The upright G passes through a slotted adjustable plate, $g$, bolted to a block upon the rear of the floor or bed, and rests upon the shaft of a pawl-and-ratchet mechanism, K, as shown in dotted lines, Fig. 1. The binder-pole I rests upon the cross-tree $h$ of the upright post H, and is provided with a hole, $i$, near its outer end, which fits the upright post G.

When the hay or like substance is placed upon the frame to a sufficient amount for a load the binder-pole is secured to the cross-tree $h$ of the post H by a rope, $k$, having one end thereof made fast to one of the sides, and its free end, after the pole is secured, fastened to the other. The cross-piece, however, may not be used except to fasten the lines and as a brace, and not as a means of securing the binder-pole; also, the employment of both the posts G H at the same time may be dispensed with and only one used, the pole G being adjustable and used ordinarily. The binder-pole, having been placed upon the post G, is now brought down upon the load by means of a cord, $l$, attached to its front end and connecting with the pawl-and-ratchet mechanism K, operated by a crank, $m$, thereby firmly binding the load upon the frame. The upright post G is provided with a series of holes, $n$, through which is intended to be passed a pin, when the load is sufficiently bound, just above the binder-pole I, to relieve the strain upon the cord $l$, which, from the inherent elasticity of the load, would be liable to break and too suddenly release the said binder-pole.

When the frame is not required for use the upright C is swung down upon the bed or floor, the binder-pole I removed from the posts G H, and the said posts in turn removed from the adjustable plates $g$ and the loops $f$ of the brace-rods $c$. The triangular piece $b$ is now removed from between the intermediate standards and the brace-rods $c$ uncoupled, thus allowing the side frames to be folded up toward each other, out of the way, and the entire frame placed in a barn or shed under cover from the weather, and where several frames are to be stored away, the side pieces being capable of folding, less room is required for their storage; or the side pieces formed by the standards D and slats E may be readily removed from the bed by the withdrawal of the bolts $a$, by which the said standards are attached to the bolsters, and the bed or floor used as an ordinary wagon-body.

In Fig. 3 I show a modification wherein only the side pieces, A, are used, without the addition of the bolsters, the standards D being bolted in mortises of cross-pieces L, the lower ends of said standards, when swung out, abutting against and bracing each other.

Having now described my invention, what I claim as new, and desire to secure by Letters Patent, is—

In a hay-frame, the pivoted standards D, ratchet mechanism K, and the brace-rods $c$, having loop or eye $f$, in combination with the binder-pole I, cord $l$, and the removable upright G, provided with a series of holes, $n$, and passing through the eye or loop of the brace-rod and through an adjustable plate, $g$, substantially as and for the purpose set forth.

In testimony that I claim the above I have hereunto subscribed my name in the presence of two witnesses.

JOHN J. SIEBERT.

Witnesses:
DAVISON WINGET,
M. M. PRENTISS.